US006976189B1

(12) United States Patent
Schoenthal et al.

(10) Patent No.: US 6,976,189 B1
(45) Date of Patent: Dec. 13, 2005

(54) PERSISTENT CONTEXT-BASED BEHAVIOR INJECTION OR TESTING OF A COMPUTING SYSTEM

(75) Inventors: Scott Schoenthal, San Ramon, CA (US); Srinivasan Viswanathan, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 656 days.

(21) Appl. No.: 10/105,060

(22) Filed: Mar. 22, 2002

(51) Int. Cl.[7] .............................................. G06F 11/00
(52) U.S. Cl. .......................................... 714/41; 714/35
(58) Field of Search ..................................... 714/35, 41

(56) References Cited

U.S. PATENT DOCUMENTS

| | | | |
|---|---|---|---|
| 3,893,024 A | 7/1975 | Reines et al. | |
| 4,937,763 A | 6/1990 | Mott | |
| 5,018,144 A | 5/1991 | Corr et al. | |
| 5,067,099 A | 11/1991 | McCown et al. | |
| 5,107,500 A | 4/1992 | Wakamoto et al. | |
| 5,377,196 A | 12/1994 | Godlew et al. | |
| 5,463,642 A | 10/1995 | Gibbs et al. | |
| 5,621,663 A | 4/1997 | Skagerling | |
| 5,627,766 A | 5/1997 | Beaven | |
| 5,627,842 A | 5/1997 | Brown et al. | |
| 5,668,991 A | 9/1997 | Dunn et al. | |
| 5,787,409 A | 7/1998 | Seiffert et al. | |
| 5,963,962 A | 10/1999 | Hitz et al. | |
| 5,983,364 A | 11/1999 | Bortcosh et al. | |
| 5,996,106 A | 11/1999 | Seyyedy | |
| 6,026,402 A | 2/2000 | Vossen et al. | |
| 6,044,214 A | 3/2000 | Kimura et al. | |
| 6,073,089 A | 6/2000 | Baker et al. | |
| H1860 H | 9/2000 | Asthana et al. | |
| 6,289,356 B1 | 9/2001 | Hitz et al. | |
| 6,631,481 B1 * | 10/2003 | Hoard et al. | 714/41 |
| 6,701,460 B1 * | 3/2004 | Suwandi et al. | 714/41 |
| 6,751,756 B1 * | 6/2004 | Hartnett et al. | 714/54 |
| 6,820,047 B1 * | 11/2004 | Aizawa et al. | 703/14 |

FOREIGN PATENT DOCUMENTS

DE 694 25 658 T2 2/1994

(Continued)

OTHER PUBLICATIONS

Coghlan et al: "Stable memory for a disk write cache." Microprocessing and Microprogramming, Elsevier Science Publishers, BV., Amsterdam, NL, vol. 41, No. 1, Apr. 1, 1995, pp. 53-70.

(Continued)

Primary Examiner—Nadeem Iqbal
Assistant Examiner—Timothy M. Bonura
(74) Attorney, Agent, or Firm—Swernofsky Law Group PC (57) ABSTRACT

The invention provides a method and system for persistent context-based behavior injection in a computing system, such as in a redundant storage system or another system having a layered or modular architecture. Behaviors that are injected can be specified to have triggering conditions, such that the behavior is not injected unless the conditions are true. Triggering conditions may include a selected ordering of conditions and a selected context for each behavior. In a system having a layered architecture, behavior injection might be used to evaluate correct responses in the face of cascaded errors in a specific context or thread, other errors that are related by context, concurrent errors, or multiple errors. Behavior injection uses non-volatile memory to preserve persistence of filter context information across possible system errors, for reporting of the results of behavior injection, and to preserve information across recovery from system errors. Multiple behavior injection threads are also provided. Behavior injection can also be performed in a logically distributed system or from a logically remote system.

High level view of a filter context

Degenerate node definition

Scope node definition

Node evaluation sample

FOREIGN PATENT DOCUMENTS

| | | |
|---|---|---|
| EP | 0 702 815 B1 | 8/2000 |
| WO | WO 94/29807 A1 | 12/1994 |

OTHER PUBLICATIONS

Gray et al: "Transaction Processing: Concepts and Techniques." 1993, Morgan Kaufmann, San Francisco, pp. 724-732.

Hutchinson et al: "Logical vs. Physical file system backup." Third Symposium on Operating Systems Design and Implementation, New Orleans, LA, USA, Feb. 1999, pp. 239-249.

Slashdot, "TUX 2: The File System That Would Be King," Oct. 17, 2000.

Wybranietz et al., "Monitoring and performance measuring distributed systems during operation," Joint International Conference on Measurement and Modeling of Computer Systems, 1988, pp. 197-206.

* cited by examiner

202 - Behavior injector components
203a & 203b - Behavior injection or testing

Fig. 3B
Degenerate node definition

Fig. 3D
Node evaluation sample

Fig. 3A
High level view of a filter context

Fig. 3C
Scope node definition

PERSISTENT CONTEXT-BASED BEHAVIOR INJECTION OR TESTING OF A COMPUTING SYSTEM

BACKGROUND OF THE INVENTION

1. Field of the Invention

The invention relates to persistent context-based behavior injection or testing of a computing system.

2. Related Art

It is desirable to test computer systems to evaluate the reliability of those systems in the face of specified conditions (when anomalous, these specified conditions are sometimes called "faults,"). In relatively complex systems, such as computer systems using relatively complex software, it is desirable for such testing to incorporate testing of interrelationships between and among components, rather than just of the operation of individual components. Moreover, in relatively complex systems, the system itself might maintain some degree of state information; it is desirable for such testing to incorporate testing of conditions for which the system response might depend on system state (whether that state is global state or specific to a selected set of components).

One known problem is that systems that are relatively more complex have a substantially larger number of possible conditions that must be tested. Some of those conditions may involve software errors, some may involve hardware failures or interruptions, and some may involve a combination thereof. Other conditions may not involve errors, but are difficult to deterministically create due to limitations on the configuration or other attributes of the system being tested. Still other conditions may not involve errors, but are in some other way difficult to create, such as being awkward, expensive, rare, or involve some other difficulty. For example, if a condition takes several hours to set up for testing, it can be difficult to test that condition repeatedly. Exhaustively generating a set of possible conditions by actual manipulation of the hardware is thus often infeasible. Artificially inducing conditions that ought to lead to the specified behaviors is then subject to the desire of covering as many possible combinations of system state and possible conditions as can be managed. In the case of a relatively complex system, it is therefore desirable to be able to induce behaviors that are related to each other, and that are designed to test the interrelationship between and among system components.

SUMMARY OF THE INVENTION

The invention provides a method and system for persistent context-based behavior injection in a computing system, such as in a redundant storage system or another system having a layered or modular architecture. Software components of the system having a layered architecture have testing locations disposed therein, each of which serves as a possible injection location. An operator can declare a scenario, with specified conditions to test for and actions to take responsive to those conditions, so as to test the system. Behaviors that are injected can be specified to have triggering conditions, such that the behavior is not injected unless the conditions are true. Triggering conditions may include, but are not limited to: (1) a selected ordering of conditions, so that for example a condition #1 occurs temporally earlier than condition #2; (2) a selected context for each behavior, so that for example a condition #3 occurs only when the system is in a selected state, or an intersection or union of a set of such selected states, or (3) a selected set of preconditions, so that for example a condition #4 occurs only within a selected type of operation, or a selected type of sub-operation within that selected type of operation. For example, in a system having a layered architecture, behavior injection might be used to evaluate correct responses in the face of cascaded errors in a specific context or thread, other errors that are related by context, concurrent errors, or multiple errors.

In one embodiment, the invention includes a redundant data storage system, such as a file server, a filer, a network cache, or one including a RAID storage system. Testing redundant data storage systems, such as for example testing for robustness of redundant data storage systems in response to errors, is relatively complex. Types of conditions for which it is desirable to test include cascaded errors, concurrent errors, errors that are related by context, multiple errors, and errors that might cause system crashes. Types of conditions for which it is desirable to test might also include software errors, software responses to hardware failures or anomalous hardware responses, and combinations thereof. When the redundant data storage system is organized using a layered architecture, it is desirable for testing to encompass not only individual software modules, but also interactions between and among software modules.

In one embodiment, behavior injection uses non-volatile memory to preserve persistence of behavior information across possible system errors, to preserve persistence of information for reporting of the results of behavior injection across possible system errors, and to preserve persistence of information relating to specified conditions and responses thereto across recovery from system errors (software crashes or panics, or hardware failures or interruptions).

In one embodiment, behavior injection uses multithreading operation, so that it can be evaluated whether specified conditions occurring within a first thread of operation (such as for example from operations performed on behalf of a first user request) have any anomalous effect on other activity (whether normal or behavior-injected) occurring within a second thread of operation. Multithreading operation also allows multiple test scenarios to be active at once; that is, multiple sets of behaviors can be injected in parallel.

In alternative embodiments, behavior injection can be performed in a logically distributed system, in which a plurality of systems act in conjunction so that behavior injection can be used to control or test code within a distributed system, from a remote system, or some combination thereof.

BRIEF DESCRIPTION OF THE DRAWINGS

FIG. 3 (collectively including FIGS. 3A, 3B, 3C, and 3D) shows a set of block diagrams of behavior injection filter contexts.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

behavior—In general, any specified activity by a computing system, such as for example an activity that is induced by a collection of program instructions. The specified activity might be intended to yield a specified result, or might include coordination between or among multiple components of the system, or both.

behavior condition—In general, an individual condition to meet for a specified behavior to be injected.

behavior context—In general, the state of the system at the time of, and in the component in which, a specified condition occurs.

behavior injection—In general, causing the system to perform the specified behavior, for example, to behave as if a specified condition has occurred.

behavior injection location—In general, a code location at which a behavior can be specified to occur.

behavior injection filter—In general, a set of conditions to meet for a behavior to be injected (that is, for the system to perform the specified behavior, rather than continue on with operations that would have occurred without behavior injection).

correct—In general, a set of software, or a software system, is considered to be correct, or to behave correctly, when its activity meets defined functional specifications or is the activity expected by the software system developers.

non-volatile memory—In general, any memory or storage disposed for recording and retrieving data persistently across a failure of at least a substantial portion of the system.

system error—In general, any system failure for which the state of the system after the failure cannot be deterministically asserted.

system error recovery—In general, any process for recovering from a system error to a state of the system which can be deterministically asserted (such as an system start-up state).

trigger—In general, a behavior condition is "triggered" when that condition is logical TRUE when tested for. In general, an action is "triggered" when its scope restrictions are met and its conditions are triggered, so that the action is performed in response.

The scope and spirit of the invention is not limited to any of these definitions, or to specific examples mentioned therein, but is intended to include the most general concepts embodied by these and other terms.

System Elements

Figure 1:
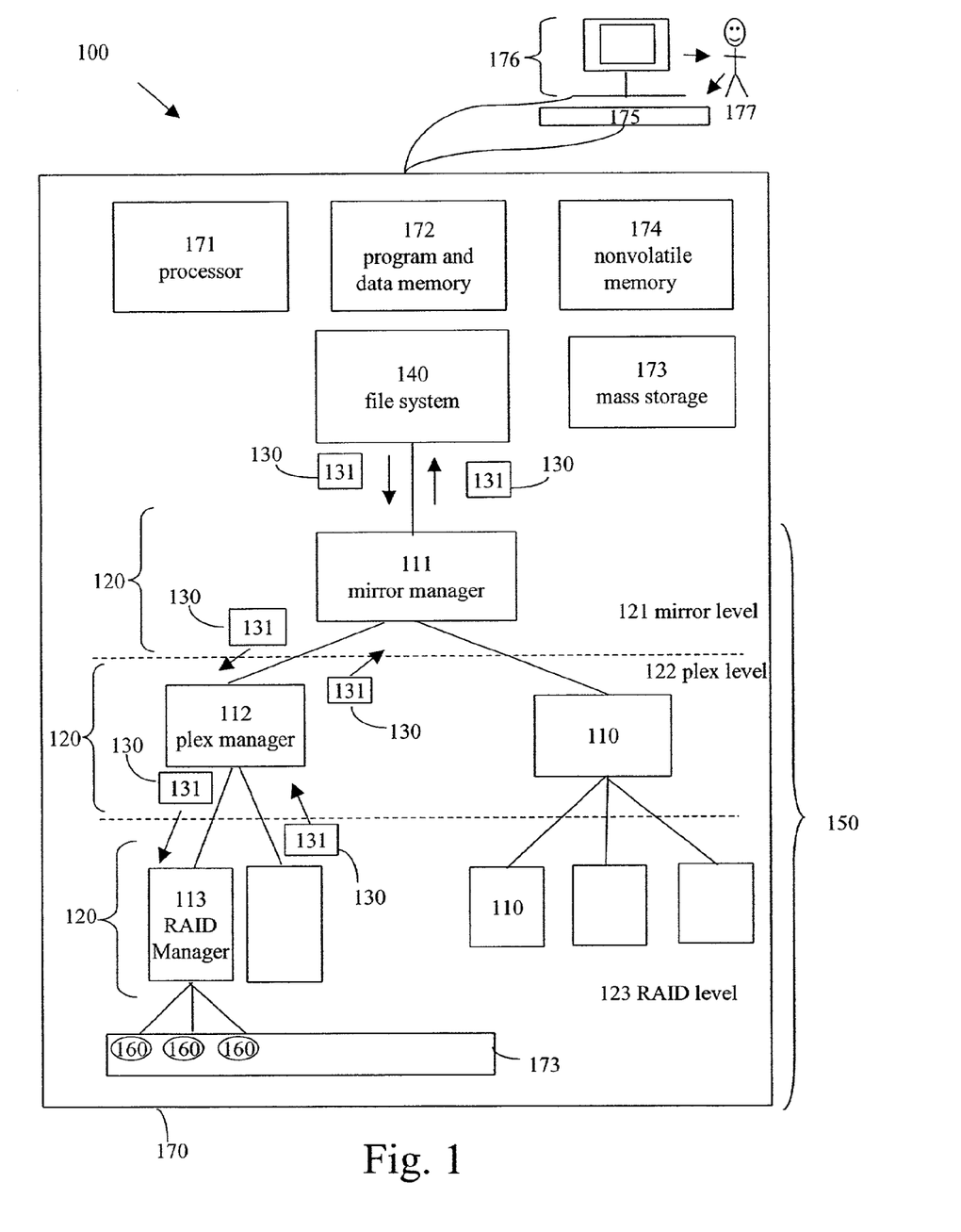
FIG. 1 shows a block diagram of a set of operations occurring in a layered architecture.

FIG. 1 shows a block diagram of a set of operations occurring in a layered architecture.

A software system 100 includes a set of software components 110 disposed in a set of functional layers 120. The software system 100 is disposed for receiving information 130 such as in the form of messages (or other data structures), and for routing information 130 between and among software components 110, as well as between and among functional layers 120.

One example described herein relates to a redundant data storage system, such as one using RAID processing. In the example, software components 110 for RAID processing are disposed in a set of functional layers 120. When a request 130 (such as a message from a user to create, edit, or delete a file) is received by the system 100, the request 130 is processed in a configuration of the storage system logically representing the generation of sub-requests 130 and the processing and responses made by those sub-requests 130. The system 100 generates a context for each request. As the request 130 is processed, its context is incremented (that is, information is added) as sub-requests 130 are generated going down the RAID tree, and decremented (that is, information is released) as sub-requests 130 are completed and responded to going up the RAID tree.

This example relating to RAID processing is merely one of many possible applications for the invention. There is no particular requirement for the invention to be restricted to RAID processing.

Moreover, this example relating to a hierarchical system is also merely one of many possible applications for the invention. There is no particular requirement for the invention to be restricted to hierarchical systems. In alternative embodiments, for example, the invention may be applied to systems in which software components 110 are disposed in a nonhierarchical manner. In such alternative embodiments, a context for a request 130 may be incremented as sub-requests 130 are generated, and decremented as those sub-requests 130 are processed and responded to, without regard for any measurement of depth in a hierarchical structure.

Moreover, this example relating to requests 130 is also merely one of many possible applications for the invention. There is no particular requirement for the invention to be restricted to request/response systems, or client/server systems, or any such system architecture or system design. In alternative embodiments, for example, the invention may be applied to any system in which a context may be created, designated, or identified, or in which a context may be incremented or decremented in response to actions by software components 110. In such alternative embodiments, a context may be created, designated, or identified; and conditions may be tested and behaviors may be injected; all without regard for specific requests or responses for a request/response system or a client/server system.

For example, in an embodiment of the software system 100 including a redundant data storage system, the software system 100 might be disposed for receiving requests 130 from a file system 140 and for providing responses 130 to the file system 140. In one example, a RAID configuration 150 includes three functional layers 120—a mirror level 121, a plex level 122, and a RAID group level 123. In this example, the mirror level 121 is responsible for assuring that data managed by plex managers 112 and 110 are kept substantially in data synchrony; the plex level 122 is responsible for assuring that data is maintained by one or more RAID groups; the RAID group level 123 is responsible for assuring that data is maintained by a plurality of disks in a RAID storage configuration.

Requests 130 from the file system 140 are received and processed by a mirror manager 111 within the mirror level 121. Each request 130 includes a context 131, such as a particular user who made the request, or a particular file the request is directed toward. The mirror manager 111 determines one or more actions to be taken regarding the request 130. These actions might include sub-requests 130, which the mirror manager 111 directs to other software elements 110. In like manner, a sub-request 130 might be directed to a plex manager 112 within the plex level 122, which itself determines one or more actions to be taken regarding the sub-request 130. These actions might include sub-sub-requests 130, and so on in like manner. Sub-requests 130 eventually get directed to a RAID manager 113 within the RAID level 123, which directs hardware disks 160 to perform operations within their function. The disks 160 provide responses to their directives, which are handled by the RAID manager 113. In like manner, the RAID manager 113 provides responses to the plex manager 112, which provides responses to the mirror manager 111.

In the event of an error, such as if one of the hardware disks 160 fails or produces an anomalous result (such as for example failing to respond to a directive), the error is directed to the RAID manager 113 within the RAID level 123, which determines what actions to be taken regarding the error. These actions might include further sub-requests 130, which the RAID manager 113 directs either to other software elements 110 or to the disks 160. For example, the RAID manager 113 might (a) direct the disks 160 to try a second time, (b) direct a different set of disks 160 to respond to a similar request, or (c) send error information to the plex manager 112 at the plex level 122. It is also possible for a first error to be followed by a second error, the latter occurring in response to the action taken regarding the error.

Requests 130, sub-request 130, sub-sub-requests 130, and the like, as well as responses 130, sub-responses 130 (that is, responses to sub-requests 130), and the like, each have associated therewith a context 131. The context 131 associated with a request 130 includes a collection of state information regarding that request 130. The state information might include, but is not limited to, at least some of the following:
- a user making the request 130;
- a sequence of requests 130 to which this request 130 belongs;
- a request 130 to which this sub-request 130 belongs;
- a set of sub-requests 130 associated with this request 130;
- a file targeted by this request 130; and
- a disk or disk sector modified by this request 130.

Context 131 for a request 130 can be used to specify whether an error for the request 130 is related to a different error (that is, an earlier or later error for the same request 130, or an error for a different request 130).

There is no particular requirement for the invention to be restricted to this particular selected set of software components 110 or functional layers 120. In alternative embodiments, there may be a different selected set of software components 110, or the software components 110 may be disposed in a different selected set of functional layers 120. Those skilled in the art would recognize, after perusal of this application, that a different arrangement or selection of functional layers 120 or of software components 10 would also be operable with the invention, and that such other different arrangements or selections are within the scope and spirit of the invention.

Moreover, there is no particular requirement in the invention for the invention to be restricted to software components 110 that are disposed in a hierarchical structure, or in a structure having layers. For example, in alternative embodiments, the software components 110 might be disposed so as to communicate or operate peer-to-peer. In such alternative embodiments, context might be routed with messages or other communication between and among software components 110, with context being incremented in response to some messages and with context being decremented in response to some responses to messages.

The software system 100 is embedded in a hardware implementation, including a computing device 170, having a processor 171, program and data memory 172, mass storage 173, and non-volatile memory 174. In one embodiment, the hardware implementation includes input/output elements including an input device 175 and an output device 176. The software system 100 is accessible by an operator 177, such as a person or group tasked with responsibility for managing the software system 100. The hardware implementation shown might also be distributed among a plurality of computing devices operating in cooperation or conjunction.

One Example of Behavior Injection

In one example, behavior injection can be used to test the system for expected operation in response to a sequence of hardware errors. Those skilled in the art will observe, after perusal of this application, how techniques shown with regard to this example can be used to provide (1) selected ordering of behaviors to be injected, (2) selected context for behaviors to be injected, (3) selected preconditions for behaviors to be injected, (4) evaluation of system correctness in the face of cascaded errors in a specific context or thread, (5) evaluation of system correctness in the face of other errors that are related by context, and (6) evaluation of system correctness in the face of concurrent or multiple errors.

In the example, the file system 140 directs a request 130 to the mirror manager 111 to read a selected disk block from the disks 160. In the ordinary course of operation, the mirror manager 111 would generate a set of responsive requests 130 directed to one of the plex manager 112, which in turn would generate a set of responsive requests 130 directed to one of the RAID managers 113, which in turn would generate a set of responsive requests 130 directed to the disks 160 (the latter in the ordinary course of RAID disk operations).

In the example, when one of the RAID managers 113 directs a read request 130 to the disks 160, an injected behavior simulates the disk 160 returning an error result instead of a successful read result. In particular, the injected behavior would replace the read result from the disk 160 with a different result that indicates an error. This injected behavior is performed in software, rather than actually having to physically remove the disk 160 from the system or turn it off or otherwise cause the disk 160 to really return an error result. That is, the injected behavior causes the RAID manager 113 to believe that the disk 160 returned an error result (and thus the RAID manager 113 ignores the actual result returned by the disk 160).

In response to the error result, the RAID manager 113 should (if operating properly) attempt follow-on requests to the same disk 160 or to other disks 160 to attempt to obtain the data, using the redundancy features of RAID. For example, the RAID manager 113 might direct a request to different disks 160 in the same RAID group, to obtain the data using the redundancy afforded by RAID.

In this example, a second injected behavior simulates the second request to disk 160 also returning an error result instead of a successful read result. This reflects a selected ordering of behaviors to be injected, and is caused by injecting the second injected behavior only in the context of the RAID manager 113 recovering from the first injected behavior. This also allows behavior injection to assist in evaluating system correctness in the face of cascaded errors, where in this example the cascaded error (and an example of multiple errors) is a consequence of multiple disk errors.

As shown below, both the first specified behavior and the second specified behavior are injected only in selected contexts. The first specified behavior injects a disk error, but only in the context of a RAID disk read—and in the example, only a first RAID disk read which has not presented a disk error before. The second specified behavior injects a disk error, but again only in a selected context, in the second case the context of a RAID disk read which is attempting a recovery from the first (injected) disk error. Those of ordinary skill in the art will recognize, after perusal of this application, that this is effectively a selected precondition for a specified behavior to be injected, and that it allows for evaluation of system correctness both in the face of errors that are related by context and for evaluation of system correctness in the face of concurrent or multiple errors.

In response to the second error result, the RAID manager 113 should (if operating properly) respond to the plex manager 112 or the mirror manager 111, so that software element can attempt follow-on requests to other RAID groups, again to attempt to get the data, in this case using the redundancy features of having multiple RAID groups.

Those of ordinary skill in the art will recognize, after perusal of this application, that this example can be extended indefinitely to include injected behaviors that continue on after the plex manager 112 or the mirror manager 111 attempts to recover from the cascaded set of disk errors, including, for example, additional disk errors returned to the RAID manager 113 in response to further directives from the plex manager 112 or the mirror manager 111, or failure of the mirror manager 111 to successfully contact the mirroring volume, and other anomalous conditions.

Moreover, there is no particular requirement for the invention to be restricted to RAID managers or to storage systems. Those of ordinary skill in the art will recognize, after perusal of this application, that the invention could be applicable to a broad range of systems. This broad range might include, but is not limited to, the following:

Client/Server systems in which a server receives and responds to requests from clients, such as for example web servers, application servers, or application service providers, and in which context is responsive to one or more of (a) client requests or server responses thereto; (b) selected data structures upon which the server operates; (c) some other division natural to the particular application implemented by the client/server system.

Database systems in which recorded data structures are manipulated by software components, and in which context is responsive to one or more of (a) queries to, or responses from, the database; (b) selected components of the database, such as tables or records; (c) administrative divisions of the database, such as selected persons or products about which information is maintained.

Real-time control systems in which a software system monitors or controls a hardware system or a set of hardware devices, such as for example a manufacturing assembly line, a refinery, or a robotic device. In such systems context might be responsive to one or more of (a) selected monitored inputs or messages from hardware devices; (b) selected outputs or messages to hardware devices; (c) selected divisions of the elements being monitored or controlled by the system.

Combinations or extensions of the above possibilities, or other possible systems within the same scope or spirit.

Behavior Injection Locations

Figure 2A:
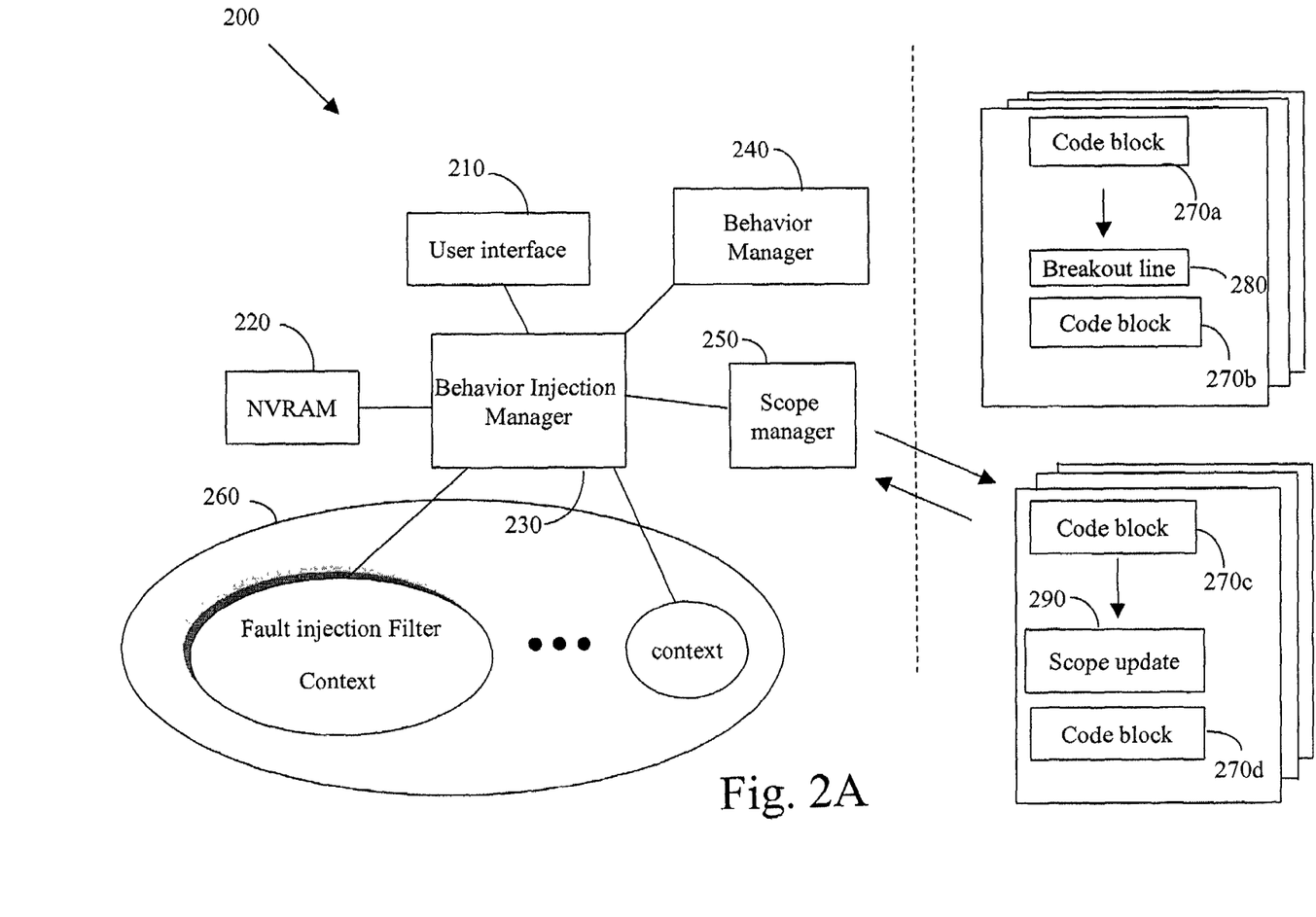
FIG. 2A shows a block diagram of a behavior injection manager and its interaction with a code base.

FIG. 2A shows a block diagram of a preferred embodiment of a behavior injection manager and its interaction with a code base.

A behavior injector 200, present in the system 100, includes a user interface 210, a NVRAM (non-volatile memory) manager 220, a behavior injection manager 230, a behavior manager 240, and a scope manager 250. The behavior injector 200 operates in conjunction with a data structure for behavior injection filter context 260, a set of code blocks 270 (collectively including individual blocks 270a, 270b, 270c, and 270d as shown in the figure), a set of breakout lines 280 disposed in sequence with those code blocks 270, and a set of scope update lines 290 disposed in sequence with those code blocks 270.

The user interface 210 includes software for receiving requests to instantiate, modify, or delete behavior injection filter contexts 260 (as further described below), and for responding to those requests in conjunction with the behavior injection manager 230. In one embodiment, the user interface 210 is disposed for receiving inputs from the operator 177, and for displaying outputs to the operator 177, relating to those requests. The user interface 210, in conjunction with the behavior injection manager 230, is also disposed for altering the behavior injection filter contexts 260 (further described with reference to FIG. 3) in response to those requests.

The NVRAM manager 220 is disposed for writing state information to the NVRAM 174, and for reading state information from the NVRAM 174 after a system panic or crash, or reboot or reset. The NVRAM manager 220 periodically writes state information (such as from the behavior injection filter contexts 260) to the NVRAM 174 to preserve that information in the event of a system panic or crash, or reboot or reset. When the system initializes after a reboot or reset, the NVRAM manager 220 reads state information to reinstantiate any behavior injection filter contexts 260 that were operational just before that reboot or reset.

The system 100 uses the NVRAM 174 of its hardware implementation to record sufficient information to be able to persistently record context 131 and perform the actions associated with injected behaviors. In one embodiment, the system 100 maintains at least the following information in the NVRAM 174:

information from the current operating context 131; and
information from the behavior injection filter contexts 260 (further described with reference to FIG. 3).

Preserving this information in the non-volatile memory 174 allows the behavior injection manager 230 to retain fault injection filter context information 260 across system reboots. Thus, if an error causes the system 100 to panic (and thus reboot), information regarding the nature of the error will be preserved in the non-volatile memory 174. Moreover, an injected behavior can force the system 100 to panic or to reboot, without fear that information needed for further operations will be lost as a consequence of the reboot.

The behavior injection manager 230 manages the behavior injection filter contexts 260, as further described with reference to FIG. 3.

The behavior manager 240 is disposed for receiving control from a software element at one of the breakout lines

280, for performing the conditional evaluation indicated by the behavior injection filter contexts 260, and (if the conditional evaluation indicates that the specified behavior is to be injected) for performing action blocks indicated by the behavior injection filter contexts 260. Presuming that the action blocks indicated by the behavior injection filter contexts 260 do not cause a system panic or crash, or reboot or restart, the behavior manager 240 returns program control to the code block 270b following the breakout line 280 when it has completed behavior injection.

The scope manager 250 is disposed for receiving and processing indications from scope update lines 290 to the effect that specified contexts have been entered or exited, and for receiving and responding to requests from scope update lines 290 to initialize or reinitialize. When a scope update line 290 indicates that a scope is being exited, the scope manager 250 performs the following actions:

- The scope manager 250 updates the current scope to indicate that the scope has been exited.
- The scope manager 250 reviews each filter context 260 to determine if that filter context 260 is applicable to the scope and yet was never triggered while executing in the scope.
- If so (that is, the filter context 260 is applicable and yet was never triggered), the scope manager 250 identifies if an action block is associated with that filter context 260 and with the scope being exited, and if so, then the behavior manager 230 executes said action block.
- If possible (that is, unless the system 100 underwent a panic or reboot), the scope manager 250 returns control to the code block 270d following the scope update line 290, in like manner as the behavior manager 240 does with regard to breakout lines 280.

A sequence of program code thus includes a set of code blocks 270 (each code block might include as little as a single line of code). A code block 270 includes instructions to the processor 171 to perform operations selected by a programmer for that code block 270. Within the sequence, one or more breakout lines 280 or one or more scope update lines 290 are included.

Each breakout line 280 indicates that a behavior might be injected into the sequence of instructions for the processor 171 to perform. As further described with reference to FIG. 3, when a breakout line 280 is encountered, the processor 171 performs the following actions:

- the processor 171 examines a set of conditions for injecting s as specified by the behavior injection filter contexts 260;
- the processor 171 determines if the conditions are met (and therefore if the behavior is to be injected at that time);
- the processor 171 performs the actions associated with the injected behavior; and
- the processor 171 continues with the next code block 270b (if possible).

The set of conditions specified by the behavior injection filter contexts 260 compare the context 131 associated with the request 130 (or response 130) with possibilities determined by the programmer of the behavior injection filter contexts 260. Thus, for one example, the programmer might specify that a behavior will only be injected if the breakout line 280 is processed while in the course of operations performed by the RAID manager 113. For a second example, the programmer might specify that a behavior will only be injected if the breakout line 280 is processed after a specific condition has already occurred while in the course of operations regarding a request within the same context.

Behaviors that are injected can be specified to have a selected context for each behavior: For example, the behavior injection filter contexts 260 might include a condition that required the system 100 to be in a specified state for the behavior to be injected. As further described with reference to FIG. 3, the condition might require the conjunction (AND) or disjunction (OR) of a set of specified states, or more generally any Boolean function of a set of specified states, such as for example ((state #1 AND state #2) AND NOT (state #3 OR state #4)). Those of ordinary skill in the art will recognize, after perusal of this application, that because the behavior injection filter contexts 260 can specify that specified behaviors will be injected only upon specified conditions, those specified behaviors can be restricted as follows:

- The specified behaviors are injected in a selected order. For example, the specified action block for the first specified behavior can set a flag or variable, while the specified condition for the second specified behavior can test for whether that flag or variable was set.
- The specified behaviors are injected in response to a selected set of preconditions. For example, the specified condition for a specified behavior can require that the system 100 is operating within selected type of operation (such as for example an operation within the RAID manager 113), or can require a selected type of sub-operation within that selected type of operation (such as for example an operation within the RAID manager 113 to recover from a disk error).
- The specified behaviors are injected in response to a selected set of multitasking conditions. For example, the specified condition for a first specified behavior can require that the system 100 is operating within a specified thread, and the action block for that specified behavior can set a flag or variable, while the specified condition for a second specified behavior can require that the system 100 is operating with a different specified thread, and further that the selected flag or variable has been set.

Thus, the programmer can specify a collection of possible conditions to be tested, each of which occurs only under conditions specified by the programmer. Each breakout line 280 therefore acts as a reference to the collection of conditions specified by the programmer. In one embodiment, once the system 100 is tested to a satisfactory degree, the breakout lines 280 and scope update lines 290 (or the routines which they reference) can have their functionality removed from the code so a version of the system 100 delivered to customers or used in a regular non-testing environment can be used without performing any of the breakout lines 280 or scope update lines 290. However, there is no particular requirement for this restriction for the invention to be operable.

In one embodiment, code referenced by breakout lines 280 or scope update lines 290 can be coded using a conditionally-compiled statement (such as #ifdef) in a programming language (such as C or C++), and can thus be restricted at the programmer's choice to program builds which are intended for testing. The #ifdef statements can be switched off with a compilation parameter, so a version of the system 100 delivered to customers or used in a regular non-testing environment can have that code removed or otherwise non-functional. In alternative embodiments, the breakout lines 280 or scope update lines 290 themselves can be removed or have their functionality removed by using #ifdef statements, so that the breakout lines 280 or scope update lines 290 themselves do not appear in non-testing versions of the code.

However, there is no particular requirement for the functionality of the breakout lines 280 or scope update lines 290 to be removed in non-testing versions of the code. For example, in alternative embodiments the code could be shipped with breakout lines 280 or scope update lines 290 included, so as to allow field-testing at a customer site. Use of the functionality associated with breakout lines 280 or scope update lines 290 might be restricted to the original programmers, or to the manufacturer's field engineers, by use of a password or other access control for turning on that functionality. Those skilled in the art will recognize, after perusal of this application, that there are many techniques that would serve to achieve these functions, and that such techniques are within the scope and spirit of the invention.

The operator 177 can also specify the actions associated with an injected behavior. These actions might include, but are not restricted to, at least some of the following possibilities:

- recording that the behavior occurred (such as by setting an error code or another system parameter);
- recording information about the context 131 in which the behavior occurred;
- altering the state of the system 100 to cause or emulate an additional behavior or other anomalous behavior;
- causing the system 100 to crash or panic; or
- causing the system 100 to reboot or restart.

If the action specified by the injected behavior is to cause the system 100 to crash or panic, or to reboot or restart, it might not be possible for the processor 171 to continue with the next code block 270b after the breakout line 280.

Multiple Behavior Injectors or Systems

In the text above, the system 100 is described with regard to having a single behavior injector 200 resident thereon and having its functions performed by a single processor 171; however, there is no particular requirement for the invention to be so limited. In alternative embodiments, there may be more than one behavior injector 200 present in a system 100, there may be one behavior injector 200 operating on behalf of a plurality of systems 100, there may be one or more behavior injectors 200 distributing their operation across a plurality of systems 100, and various combinations or extensions of these cases.

Figure 2B:
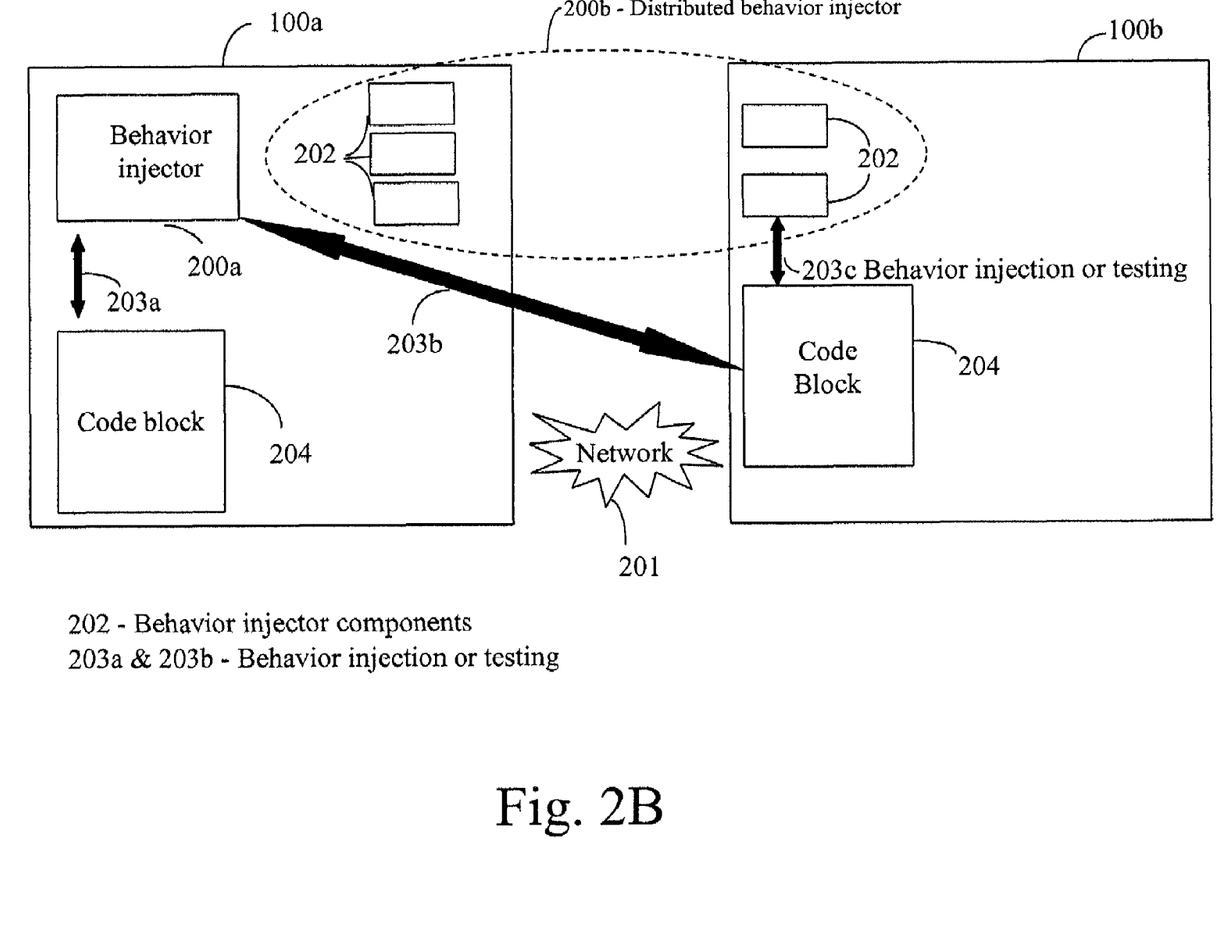
FIG. 2B shows a block diagram of a set of multiple behavior injectors and systems.

FIG. 2B shows a block diagram of a set of multiple behavior injectors and systems.

In one embodiment, a plurality of behavior injectors 200 may logically exist on (that is, have its instructions stored on and performed by) a single system 100.

In another embodiment, a plurality of systems 100 may be connected over a local area network 201 for purposes of availability, capacity, performance, or some combination thereof. In such an embodiment, the behavior injector 200 may be utilized to control, through the injection of behaviors, the execution of code blocks 270 (along with associated breakout lines 280 and scope lines 290) executing on one or more of the plurality of systems 100. The behavior injector 200 may logically exist on only one of the plurality of systems 100, or may logically exist as a plurality of behavior injectors 200 on a plurality of the systems 100.

When logically existing as a plurality, the behavior injectors 200 may communicate with each other over shared system memory or via shared network 201.

Alternatively, the behavior injector 200 may logically exist as a plurality of individual components 202 distributed within the plurality of systems 100 and using a shared network to communicate (that is, each component has its instructions stored on and performed by at least one of the plurality of systems 100). For example, an individual component 202 may be a single behavior injector manager 230 which communicates with several behavior managers 240 and scope managers 250, each having its instructions stored on and performed by different software systems 100; in order to provide behavior injection services (that is, to control the execution of code blocks 270) to the plurality of systems 100.

In an embodiment with a plurality of behavior injectors 200, invocation of a breakout line 280 or scope update 290 results in communication with a behavior injector 200. The behavior injector 200 that is communicated with might be either logically local to the software system on which code block 270 exists, or might be logically remote (that is, another behavior injector 200 in the plurality of software systems 100), or might communicate with multiple behavior injectors 200, of both types.

In cases where the behavior injector 200 and the code blocks 270 it controls do not reside on the same software system 100, the behavior injector 200 may control those code blocks 270 using local behavior injection filter contexts (such as by using a behavior injection manager 230 logically local to the same software system 100), or may control those code blocks 270 using components 202 resident on the software system on which the breakout line 280 or scope update line 290 was encountered, or both.

Similarly, the action code blocks 312 that are invoked as a result of a successful conditional evaluation by the behavior injector 200 may be performed on the same system 100 containing the behavior injector 200 or on the system containing the code blocks that originally passed control to the breakout line and/or scope update or on a third system in the plurality of software systems 100.

In such cases, the behavior injector 200 may also dynamically transmit a sequence of instructions associated with the action code block 312 to a different system 100 to be performed if those instructions are not already recorded at that different system 100.

Similarly, the operator 177 may access the behavior injector 200 at the same (logically local) system 100, or from a logically remote system 100.

Those of ordinary skill in the art will recognize, after perusal of these examples and of this application, that many variants of these examples, along with many variants of the assembly of behavior injectors 200 from individual components 202, are possible, and that such variants are within the scope and spirit of the invention.

Behavior Injection Filters

FIG. 3 (collectively including FIGS. 3A, 3B, 3C, and 3D) shows a set of block diagrams of behavior injection filter contexts.

Figure 3A:
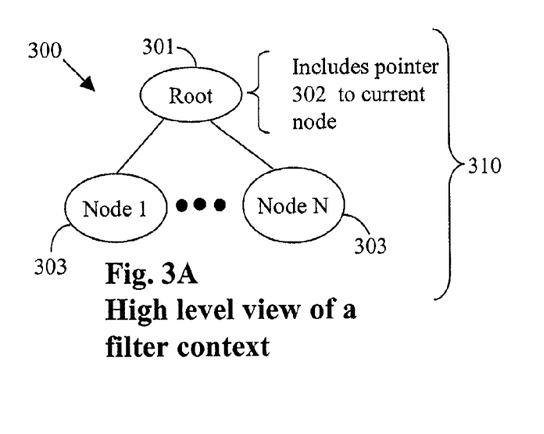

A set of behavior injection filter contexts 260 includes a behavior-injection tree 300, the behavior-injection tree 300 including a set of behavior-injection filters 310 and a set of scope nodes 320. The behavior-injection tree 300 includes a root node 301, which contains state information including a node pointer 302, and an ordered sequence of subordinate nodes 303.

The node pointer 302 references a current one of the subordinate nodes 303 that is next to be performed.

Figure 3B:
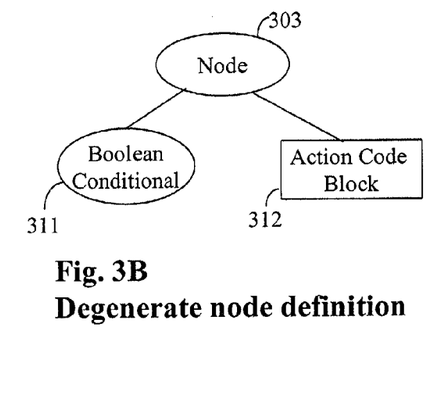

Each individual behavior-injection filter 310 includes a subtree with an individual subordinate node 303 as its root node. The filter 310 includes a condition node 311 describing a Boolean conditional to be evaluated by the behavior injection manager 230, and an action code block 312 describing an action to be performed if the Boolean conditional evaluates to a logical TRUE value.

The condition node 311 might include a logical function, such as a logical AND, logical OR, logical Exclusive OR, or logical NOT, which is applied to one or more logical arguments, themselves represented by subtrees.

Figure 3C:
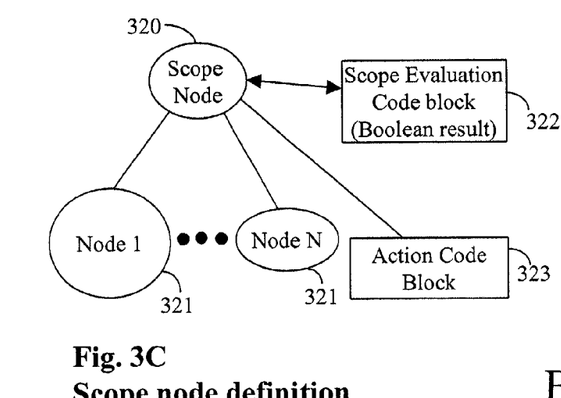
Figure 3D:
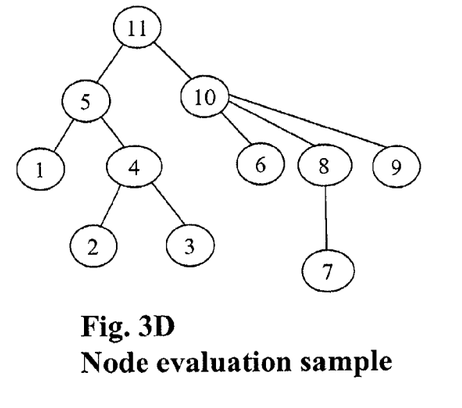

The condition node 311 might alternatively include a control function, such as an interator function, which is applied to one or more condition arguments, themselves represented by subtrees, and which is only evaluated during the selection of the "next" node as indicated in FIG. 3D. One example of a control function would be a "repeat" iterator, which would return a logical FALSE value a designated number of times, after which it would return a logical TRUE value. Thus, "repeat 10 times" would cause its conditional arguments to be evaluated 10 times, and only thereafter return a logical TRUE value. The "repeat" iterator is useful for testing the performance of code that is repeatedly executed.

The action code block 312 includes a memory pointer reference to a set of program instructions (that is, a code block) to be performed on the condition that the Boolean condition evaluates to a logical TRUE value. For example, the action code block 312 might specify one or more of the following actions:
  delay a selected amount of time
  halt the system
  take no action (do nothing)
  cause the system to panic
  cause the system to reboot
  simulate a disk read error (by altering data contained in the control structures associated with a disk read buffer)

There is no particular requirement to use these specific actions; in alternative embodiments, action blocks 312 might specify different actions instead, other actions in addition, or other control structure by which actions might be combined. Moreover, in one embodiment, additional operators for the condition node 311 or the action code block 312 might be defined using run-time code.

Here is one detailed example of the behavior injected by an action code block 312. Those of ordinary skill in the art will appreciate, after perusal of this application and this example, those techniques for how arbitrarily selected behaviors can be injected. In this example, the action code block 312 simulates a disk read error: The system 100 inserts an error code into the buffer in which a disk controller would otherwise have placed a return value, and transfers control to the program code block 270b after the call to the disk controller. Thus, the program code block 270b after the call to the disk controller, when it checks the error code, will believe that the disk controller detected an error (that is, that the disk 160 returned an error result), and will proceed accordingly. This has the effect of simulating, by means of a software error code, that the disk 160 returned an error result rather than a successful read result. Thus, the system 100 can check to see what happens as a consequence of a disk error, without having to actually remove the disk 160. Similarly, the system 100 can check to see what happens as a consequence of several disk errors, such as a set of cascading disk errors for the same data accessible on different disks 160.

Each scope node 320 includes a set of subordinate nodes 321, a scope evaluation block 322, and a scope action block 323. A scope node 320 describes a set of behaviors that might be injected in response to exiting a specified scope, as further described below. The particular scope is specified by the scope evaluation block 322. In one embodiment, when the specified scope is exited, the scope evaluation block 322 is performed, and if the result of that scope evaluation block 322 is logical TRUE, it is determined if any one or more of the subordinate nodes 321 indicates a behavior-injection filter 310 or a scope node 320 which has not been triggered. If at least one such subordinate node 321 has not been triggered, the scope action block 323 is performed.

The scope evaluation block 322 includes a logical condition to be evaluated, in like manner as one of the condition nodes 311.

In one embodiment, the scope evaluation block 322 is responsive to a scope as defined by traversal of program code from one software component 110 to another, through the set of defined functional layers 120. Thus, the mirror level 121, the plex level 122, and the RAID group level 123 would each define a scope.

However, there is no particular requirement for defining scope by software components. Scope may also be defined in response to a selected request from a user (such as for example, a request to delete a file), or in response to a sub-request generated from the request (such as for example, a request to read a particular disk block). In the latter case, if the sub-request is generated from the request, the scope associated with the sub-request would be a sub-scope (a subset of the scope) associated with the original request.

Each subordinate node 321 describes either an individual behavior-injection filter 310, or a subordinate scope node 320. Evaluation for the tree of these subordinate nodes 321 is performed in a depth-first manner, with subordinate nodes 321 being evaluated bottom up and left-to-right. Thus, as shown with reference to FIG. 3D, when a node #1 is subordinate to a node #2, or when a node #1 is leftward of a node #2, the node #1 is performed before the node #2.

In one embodiment, the operator 177 can enter one or more commands to be parsed and performed by the processor 171. These commands allow the operator 177 to set, clear, or modify the behavior injection filter contexts 260. Thus, at run time for the system 100, the operator 177 might select one or more behavior injection filter contexts 260, and therefore sets of behaviors to be injected, for testing the system 100.

Traversing the Code Path

Figure 4:
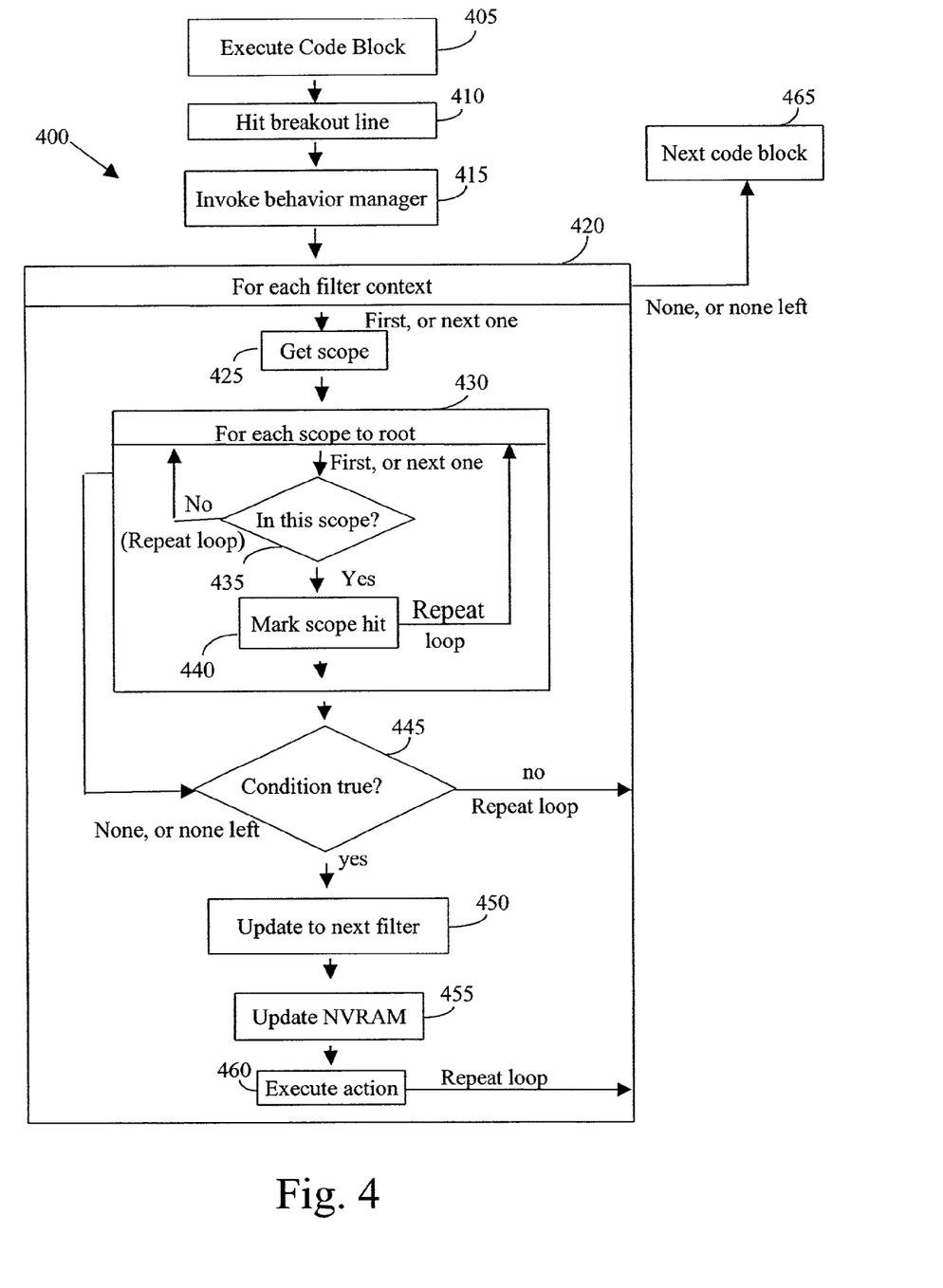
FIG. 4 shows a flow diagram of a method of traversing a code path associated with a software component.

FIG. 4 shows a flow diagram of a method of traversing a code path associated with a software component.

A method 400 includes a set of steps, and is performed by the processor 171. Although the method 400 is described serially, its flow points and steps can be performed by separate elements in conjunction or in parallel, whether asynchronously or synchronously, in a pipelined manner, or otherwise. There is no particular requirement that the method must be performed in the same order in which this description lists flow points or steps, except where explicitly so indicated.

At a step 405, a code block 270a associated with a particular software component is executed.

At a step 410, a breakout line 280 is encountered.

At a step 415, the behavior manager 240 is invoked. The behavior manager 240 is responsible for dispatching code blocks 270 (in this example, code block 270a) to be tested, evaluating filter conditions, invoking action blocks using the behavior injection manager 230, and restoring control to the next code block 270b after the breakout line 280 upon completion of all triggered filters.

The flow point 420 indicates a "filter context" loop construct, at which the behavior manager 240 examines each existing filter context 131 associated with the code block 270a. If there are no such filter contexts 131, or if (when the loop is repeated) there are no filter contexts 131 remaining, the "filter context" loop construct is done, and the method 400 proceeds with the step 465. Within the "filter context" loop construct, the behavior manager 240 identifies the current filter context, and gets a node pointer to the current filter context.

The flow point 430 indicates a "scope" loop construct, at which the scope manager 250 examines each scope node in a path from the current scope node to a root of the scope tree. If there is no such scope (thus, the step 425 returned no pointer to a current scope), or if (when the loop is repeated) there are no scopes remaining, the "scope" loop construct is done, and the method 400 proceeds with the step 445.

The scope manager 250 is responsible for initializing and reinitializing the current scope for the code block 270a under test, and (as further described with regard to FIG. 5) for dispatching enter and leave indications from the code block 270a under test. The scope manager 250 also conditionally invokes action blocks and restores control to the next code block 270b after the breakout line 280 upon completion.

At a step 435 in the "scope" loop construct, the scope manager 250 determines if the scope evaluation function block return is logical TRUE. If not, the method 400 repeats the loop for the next filter. If so, the method 400 proceeds with the step 440.

At a step 440 in the "scope" loop construct, the scope manager 250 determines if this is the first conditional match for this scope node. If so, the scope node is initialized to include information to identify the current scope. This initialization causes other nodes (including sibling nodes) to be subsequently analyzed.

Information to identify the current scope is responsive to how the scope is defined. As noted herein, in one embodiment, the current scope might be defined responsive to a request made by a user, in which case information to identify the current scope would include information about the current such request or sub-request being performed. As noted herein, in another embodiment, the current scope might be defined responsive to something else, such as what process was executing the code block 270a when the breakout line 280 was encountered. Those skilled in the art will recognize, after perusing this application, that information to identify the current scope allows the filter contexts to determine if the code block 270a is being executed in response to the same context 131, so that conditions can be tested for only that same context 131.

After initializing the current scope, the method 400 repeats the "scope" loop construct until there are no scopes left. The method 400 then proceeds with the step 445.

At a step 445 within the "filter context" loop construct, the behavior manager 240 obtains the current node pointer and determines if the conditional return is based upon the context at the point in time when the breakout line is invoked, including any parameters that are passed to the behavior manager as part of the invocation of the breakout line (that is, the condition is evaluated and returns a logical TRUE). If the condition does not return a logical TRUE, the method 400 repeats the loop for the next filter context. If so, the method 400 proceeds with the step 450.

At a step 450 within the "filter context" loop construct, the behavior manager 240 updates a pointer to a node in the filter context tree. The behavior manager 240 performs this update such that updating occurs from the bottom to the top of the tree, and from the left to the right of the tree.

At a step 455 within the "filter context" loop construct, the NVRAM is updated.

At a step 460 within the "filter context" loop construct, an action block 312 associated with the filter context and node identified in step 420 is executed.

After executing the action block 312, the method 400 repeats the "filter context" loop construct until there are no filter contexts left. The method 400 then proceeds with the step 465.

At a step 465, the behavior manager 240 restores control to the next code block 270b after the breakout line 280.

The processor 171 is then ready to proceed with the next code block 270b after the breakout line 280, and the method 400 is ready to be performed another time at the next breakout line 280.

Exiting a Specified Scope

Figure 5:
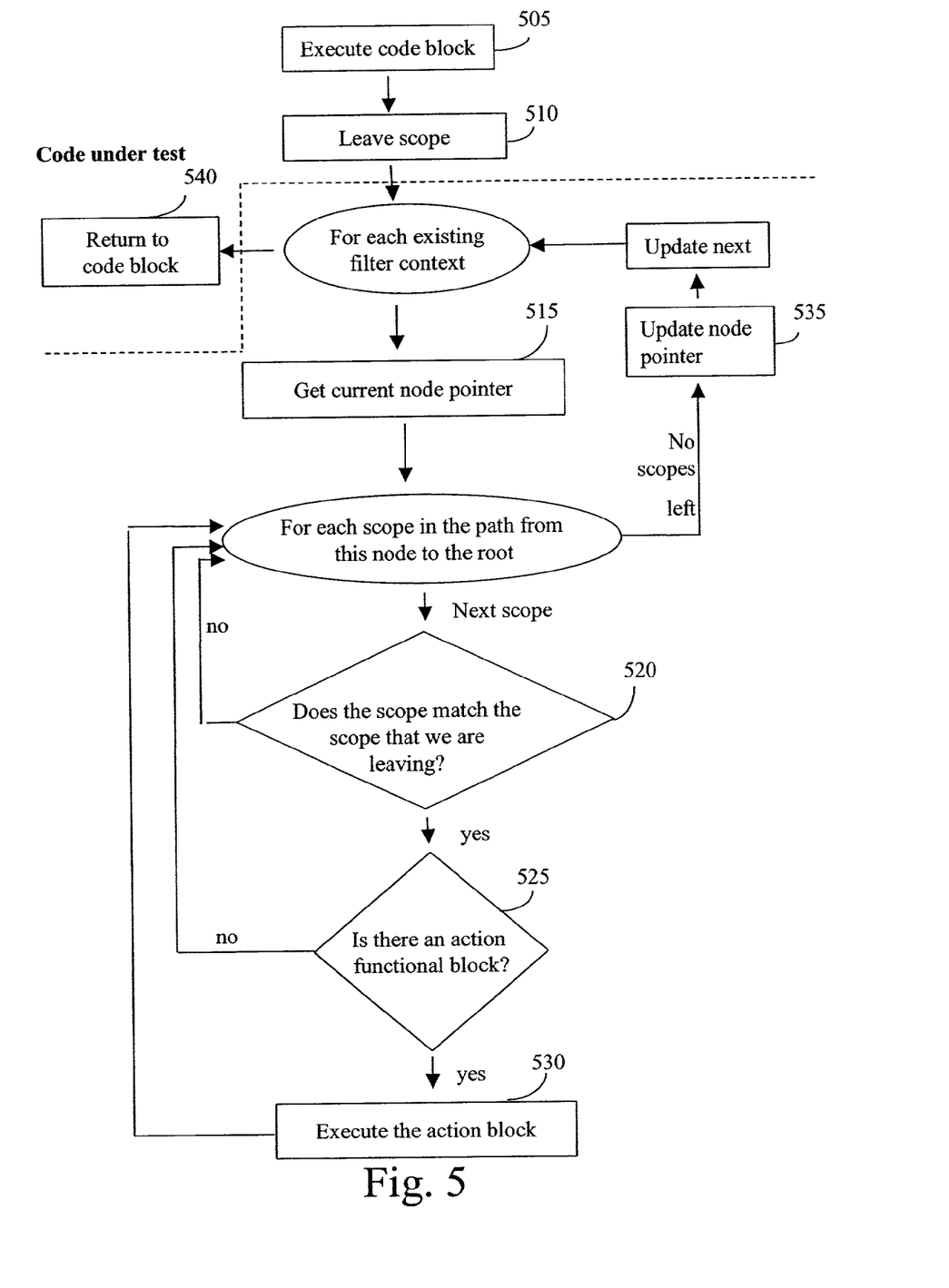
FIG. 5 shows a flow diagram of a method of exiting a specified scope.

FIG. 5 shows a flow diagram of a method of exiting a specified scope.

The method 500 is described serially, its flow points and steps can be performed by separate elements in conjunction or in parallel, whether asynchronously or synchronously, in a pipelined manner, or otherwise. There is no particular requirement that the method must be performed in the same order in which this description lists flow points or steps, except where explicitly so indicated.

In one embodiment, additional instrumentation provides input regarding the entry and leaving of a scope node to the behavior injection manager 250. One example of entry and leaving of a scope node includes the commencement or completion of a disk read operation.

At a step 505, the code block 270 associated with a particular software component is executed.

At a step 510, the scope node is exited. This involves performing steps 515–535 for every filter context.

At a step 515, the current node pointer in the filter context is identified.

At a step 520, the scope manager 250 determines if the scope node matches a scope evaluation code block. If there is a match, the method 500 proceeds at step 525. If there is not a match, a new scope node in the path from this node to the root node is identified and this step is repeated.

At a step 525, the scope manager 250 determines if there is an action functional block. If there is not an action functional block, a new scope node in the path from this node to the root is identified and the method continues at step 520. If there is an action functional block, the method 500 proceeds at step 530.

At a step 530, the action code block is executed. The method 500 proceeds with the step 520 and is repeated until there are no scope nodes remaining that have not been traversed. When there are no remaining scope nodes, the method proceeds at step 535.

At a step 535, the node pointer is updated in the bottom-up, left-first manner described earlier and illustrated in FIG. 3D.

At a step 540, control is restored to the code block 270.

ALTERNATIVE EMBODIMENTS

Although preferred embodiments are disclosed herein, many variations are possible which remain within the concept, scope, and spirit of the invention. These variations would become clear to those skilled in the art after perusal of this application.

What is claimed is:

1. A method, including steps of performing a set of program instructions using a computing device, said program instructions including one or more breakout lines; maintaining a set of context information regarding one or more operations in progress by said computing device; injecting a behavior in response to at least one of said breakout lines, conditionally in response to at least a portion of said context information; wherein said instructions include a plurality of independent software components; and said context information is preserved across transfers of control within computing device between instructions for different ones of said software components.

2. A method as in claim 1, including steps of reporting a result of said steps of injecting.

3. A method as in claim 1, including steps of reporting a result of said steps of injecting; and
altering said program instructions in response to a result of said steps of reporting, and producing an altered set of said program instructions which complies with developer expectations with regard to said injected behaviors.

4. A method as in claim 1, wherein a result of said injecting steps includes a simulation of a set of cascaded errors.

5. A method as in claim 1, wherein a result of said injecting steps includes a simulation of a set of concurrent errors in response to multiple requests received by said computing device.

6. A method as in claim 1, wherein a result of said injecting steps includes a simulation of a correct behavior.

7. A method as in claim 1, wherein a result of said injecting steps includes at least one of: altering a system variable, causing a system panic, causing a system reboot, modifying contents of system memory.

8. A method as in claim 1, wherein
said computing device includes a redundant data storage system; and
said context information includes information regarding a file server request.

9. A method as in claim 1, wherein said context information includes at least one of:
a request received by said computing device;
a set of behaviors already injected in response to at least one said breakout line.

10. A method as in claim 1, wherein
said computing device performs multiple threads of said instructions concurrently; and
said context information for a first said thread is responsive to at least one operation in progress in a second said thread.

11. A method as in claim 1, wherein
said set of program instructions are maintained on a first said computing device; and
said steps of injecting are performed at least in part at a second said computing device different from said first computing device.

12. A method as in claim 1, wherein said steps of injecting are responsive to one or more behavior injection filters, each said behavior injection filter including at least one associated condition and at least one associated behavior for injection.

13. A method as in claim 1, including a non-volatile memory, said nonvolatile memory including sufficient information to preserve persistence of said context information across a system reboot.

14. A method as in claim 13, wherein said injected behavior includes a system reboot.

15. A method as in claim 1, wherein said context information is updated in response to said transfers of control.

16. A method as in claim 1, wherein
said software components are disposed in an architecture having a first and second layer;
said context information is incremented in response to transfers of control from said first to said second layer; and
said context information is decremented in response to transfers of control from said second to said first layer.

17. A method, including steps of
performing a set of program instructions using a computing device, said program instructions including one or more breakout lines;
maintaining a set of context information regarding one or more operations in progress by said computing device;
injecting a behavior in response to at least one of said breakout lines conditionally in response to at least a portion of said context information;
wherein
said steps of injecting are responsive to a plurality of behavior injection filters, each said behavior injection filter including at least one associated condition and at least one associated behavior for injection; and
said context information includes a set of trigger information for a first one of said behavior injection filters, said trigger information indicative of whether said first behavior injection filter has been triggered within said context;
and including steps of
injecting a second behavior in response to said trigger information and in response to a change in said context information.

18. A method, including steps of
performing a set of program instructions using a computing device said program instructions including one or more breakout lines;
maintaining a set of context information regarding one or more operations in progress by said computing device;
injecting a behavior in response to at least one of said breakout lines conditionally in response to at least a portion of said context information;
wherein
said steps of injecting are responsive to a plurality of behavior injection filters, each said behavior injection filter including at least one associated condition and at least one associated behavior for injection;
said context information includes a set of trigger information for a first one of said behavior injection filters, said trigger information indicative of whether said first behavior injection filter has been triggered within said context;
said sequence of instructions includes one or more scope update lines, said scope update lines being indicative of a change in said context information;
and including steps of injecting a second behavior in response to said trigger information and in response to at least one of said scope update lines.

19. Apparatus including
a computing device having a set of program instructions, said program instructions including one or more breakout lines;
a storage medium accessible by said computing device, said storage medium having a set of context information regarding one or more operations in progress by said computing device;
wherein said computing device includes an instruction responsive to at least one of said breakout lines, said instruction causing a behavior to be injected in response to said one breakout line, conditionally in response to at least a portion of said context information;
wherein
said instructions include a plurality of independent software components; and
said computing device includes an instruction preserving said context information across transfers of control within said computing device between instructions for different ones of said software components.

20. Apparatus as in claim 19, wherein said storage medium includes a result of said steps of injecting.

21. Apparatus as in claim 19, wherein
said computing device includes a redundant data storage system; and
said context information includes information regarding a file server request.

22. Apparatus as in claim 19, wherein said context information includes at least one of:
a request received by said computing device;
a set of behaviors already injected in response to at least one said breakout line.

23. Apparatus as in claim 19, wherein
said computing device includes multiple concurrent threads of said instructions; and
said context information for a first said thread includes information regarding at least one operation in progress in a second said thread.

24. Apparatus as in claim 19, wherein
said set of program instructions are maintained on a first said computing device; and
said instruction causing a behavior to be injected causes at least one additional instruction to be performed at least in part at a second said computing device different from said first computing device.

25. Apparatus as in claim 19, including one or more behavior injection filters, each said behavior injection filter including at least one associated condition and at least one associated behavior for injection.

26. Apparatus as in claim 19, including a non-volatile memory, said nonvolatile memory including sufficient information to preserve persistence of said context information across a system reboot.

27. Apparatus as in claim 19, wherein said computing device includes an instruction updating said context information in response to said transfers of control.

28. Apparatus as in claim 19, wherein
said software components are disposed in an architecture having a first and second layer;
said computing device includes an instruction incrementing said context information in response to transfers of control from said first to said second layer; and
said computing device includes an instruction decrementing said context information in response to transfers of control from said second to said first layer.

29. Apparatus, including
a computing device having a set of program instructions, said program instructions including one or more breakout lines;
a storage medium accessible by said computing device said storage medium having a set of context information regarding one or more operations in progress by said computing device;
wherein said computing device includes an instruction responsive to at least one of said breakout lines, said instruction causing a behavior to be injected in response to said one breakout line, conditionally in response to at least a portion of said context information;
and including a plurality of behavior injection filters, each said behavior injection filter including at least one associated condition and at least one associated behavior for injection;
wherein
said context information includes a set of trigger information for a first one of said behavior injection filters, said trigger information indicative of whether said first behavior injection filter has been triggered within said context; and
said computing device includes an instruction responsive to said trigger information, said instruction causing a second behavior to be injected in response to a change in said context information.

30. Apparatus including
a computing device having a set of program instructions, said program instructions including one or more breakout lines;
a storage medium accessible by said computing device, said storage medium having a set of context information regarding one or more operations in progress by said computing device;
wherein said computing device includes an instruction responsive to at least one of said breakout lines, said instruction causing a behavior to be injected in response to said one breakout line, conditionally in response to at least a portion of said context information;
and including a plurality of behavior injection filters, each said behavior injection filter including at least one associated condition and at least one associated behavior for injection;
wherein
said context information includes a set of trigger information for a first one of said behavior injection filters, said trigger information indicative of whether said first behavior injection filter has been triggered within said context;
said sequence of instructions includes one or more scope update lines, said scope update lines being indicative of a change in said context information; and
said computing device includes an instruction responsive to said trigger information, said instruction causing a second behavior to be injected in response to at least one of said scope update lines.

* * * * *